(12) United States Patent
Kuhlow et al.

(10) Patent No.: US 6,347,166 B1
(45) Date of Patent: Feb. 12, 2002

(54) DEVICE FOR SUPERPOSING OPTICAL SIGNALS WITH DIFFERENT WAVELENGTHS

(75) Inventors: Berndt Kuhlow; Georges Przyrembel, both of Berlin (DE)

(73) Assignee: Heinrich Hertz Institut fuer Nachrichtentechnik Berlin GmbH, Berlin (DE)

(*) Notice: Subject to any disclaimer, the term of this patent is extended or adjusted under 35 U.S.C. 154(b) by 0 days.

(21) Appl. No.: 09/423,991

(22) PCT Filed: May 15, 1998

(86) PCT No.: PCT/DE98/01405

§ 371 Date: Nov. 17, 1999

§ 102(e) Date: Nov. 17, 1999

(87) PCT Pub. No.: WO98/57202

PCT Pub. Date: Dec. 17, 1998

(30) Foreign Application Priority Data

May 17, 1997 (DE) .......................................... 197 20 852

(51) Int. Cl.⁷ ................................................. G02B 6/26
(52) U.S. Cl. .............................. 385/15; 385/24; 385/31; 385/37; 359/115; 359/127; 359/130
(58) Field of Search .............................. 385/15, 17, 24, 385/16, 37, 31; 359/115, 127, 130

(56) References Cited

U.S. PATENT DOCUMENTS

| 4,786,131 A | | 11/1988 | Mahapatra et al. ...... 350/96.16 |
| 5,136,671 A | * | 8/1992 | Dragone ...................... 385/46 |
| 5,889,906 A | * | 3/1999 | Chen ........................... 385/28 |

* cited by examiner

Primary Examiner—Rodney Bovernick
Assistant Examiner—Sung Pak
(74) Attorney, Agent, or Firm—Karl Hormann

(57) ABSTRACT

The invention relates to a device for superposing optical signals of different wavelengths. The device is provided with a light guide grid disposed between an input free beam coupler and an output free beam coupler, the input free beam coupler being provided at its input side with at least two input light guide units and an output light guide unit including a plurality of output light guides being to the output side of the free beam coupler. The aperture areas of the input light guide units are arranged and dimensioned relative to the the aperture areas of the output light guides such that each output light guide is affected by at least two optical signals of different wavelengths from the input light guides.

9 Claims, 2 Drawing Sheets

DEVICE FOR SUPERPOSING OPTICAL SIGNALS WITH DIFFERENT WAVELENGTHS

BACKGROUND OF THE INVENTION

1. Field of the Invention

Figure 1:
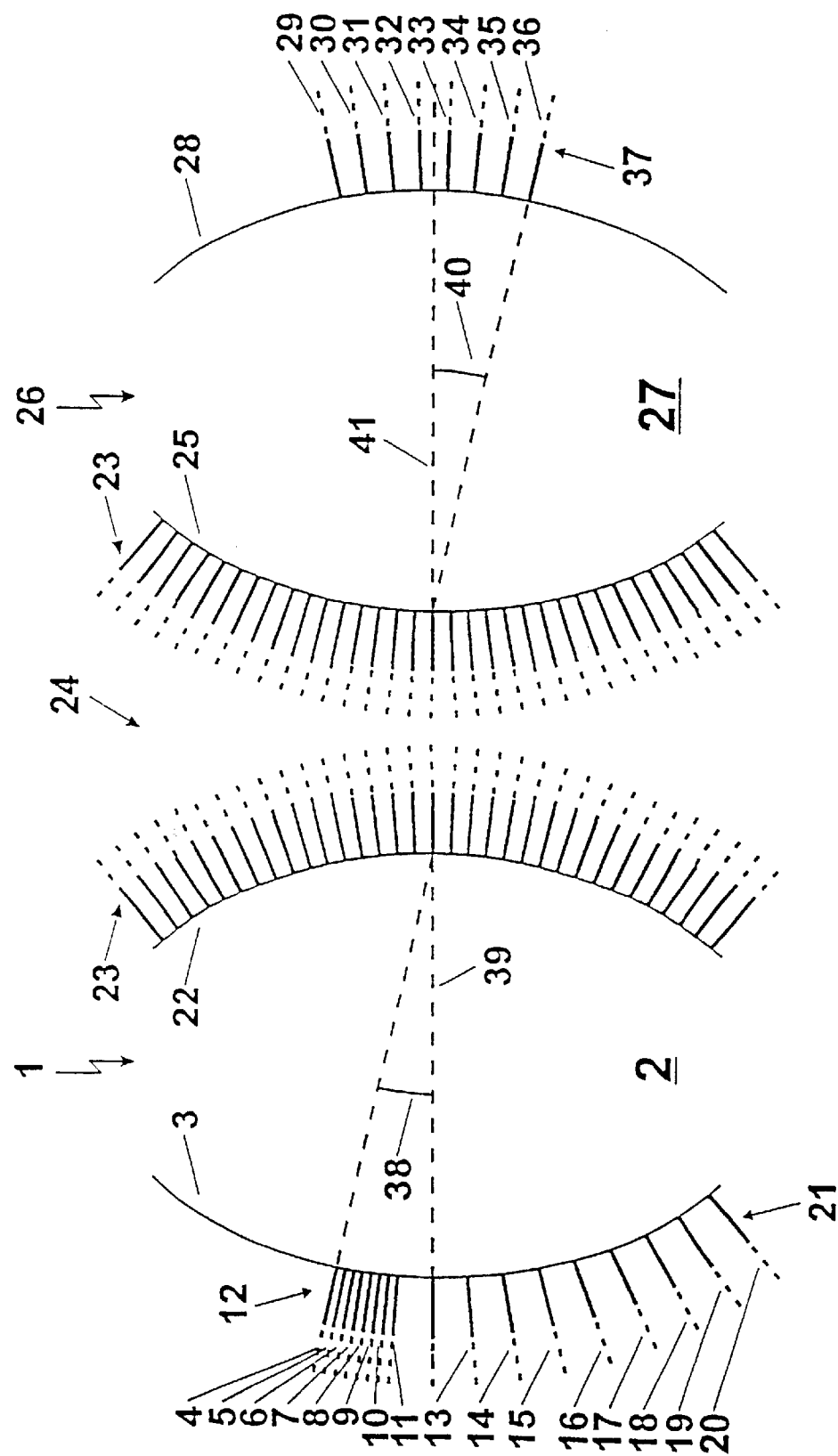

The invention relates to a device for superposing optical signals of different wavelengths, the device being provided with an input free beam coupler and an output free beam coupler the free beam sections of which are coupled to each other by phase shift light guides of a light guide grid, with a first input light guide unit connected to the input free beam coupler and with at least one further input light guide unit whereby at least one wavelength may be conducted in each input light guide unit, and with an output light guide unit provided with a plurality of output light guides, the output light guides being connected to the output free beam coupler and arranged such that each of the output light guides may be energized by at least two optical signals of different wavelengths.

2. The Prior Art

Such a device is known from U.S. Pat. No. 5,440,416. That prior art device is provided with an input free beam coupler and an output free beam coupler the free beam sections of which are coupled to each other by a light guide grid. Furthermore, the prior art device is provided with two input light guide units each one of which is provided with an input light guide. Optical signals of different wavelengths may be fed into the input light guide of one input light guide unit. This input light guide is connected to the input free beam coupler. The input light guide of the other input light guide unit is connected to the side of the output free beam coupler which is connected to the light guide grid. In addition, output light guides of an output light guide unit are connected to the output free beam coupler, the output light guides being arranged such that each of them may be energized by a signal from the input light guide connected to the input free beam coupler and by a signal from the input light guide connected to the output free beam coupler.

Because of the imaging function of the so-called phased array spectograph formed by the input free beam coupler, the light guide grid and the output free beam coupler, the optical signals of different wavelengths propagating in the input light guide of the input light guide unit connected to the input free beam coupler are each conducted to associated output light guides. The optical signal propagating in the input light guide of the input light guide unit connected to the output free beam coupler is spreading as a spherical wave into the free beam section of the output free beam coupler and impinges upon the output side of the output free beam coupler to which the output light guides are connected.

While it is possible with the prior art device to carry out the function of a multiplexer by feeding the wavelengths propagating in the two input light guide units to associated output light guides, it suffers from the disadvantage of resultant relatively high losses.

An optical multiplexer is also known from EP 528,652 which is not, however, provided with any further input light guide unit. This publication describes the periodic transfer characteristic which makes possible the occurrence in an output waveguide of signals of wavelength period $\alpha\lambda$ from an input waveguide (i.e. in addition to wavelength $\lambda_1$ there occurs the next periodically possible wavelength $\lambda_2=\lambda_1+\Delta\lambda$ and, further, $\lambda_3=\lambda_1+2*c16536D\,\Delta\lambda\ldots$ etc.) This constitutes a specific embodiment of a spectograph in planar waveguide technology.

OBJECT OF THE INVENTION

It is an object of the invention to provide a device of the kind referred to hereinabove which is characterized by low attenuation losses.

BRIEF SUMMARY OF THE INVENTION

The object is accomplished by the at least one other input light guide unit converging into the free beam section of the input free beam coupler and by converging sections of the input light guide units being arranged and dimensioned according to the equation.

$$\Theta_{IN}^{(i)} = \frac{m}{n_s d}\left\{\lambda^{(i)} - \lambda_c\left[1 + \frac{1}{n_c}\frac{dn_c}{d\lambda}\bigg|_{\lambda=\lambda_c}(\lambda^{(i)}-\lambda_c)\right]\right\} - \Theta_{OUT}^{(i)}$$

wherein $\lambda_{(i)}$ is the wavelength conducted in an input light guide of the input light guide units; $\lambda_c$ is the central wavelength of the device; m is the order of refraction of the light guide grid; $n_c$ is the effective index of refraction of the phase shift light guide; $n_s$ is the effective refractive index of the free beam sections; d is the grid constant or pitch of the phase shift light guides at the transition to the output free beam section of the output free beam coupler; $\Theta^{(i)}_{IN}$ is the incoupling angle of the $i^{th}$ input light guide relative to the input axis of symmetry and $\Theta^{(i)}_{OUT}$ is the outcoupling angle relative to the output axis of symmetry of the output free beam section, such that each output light guide may be charged with at least two optical signals of different wavelengths which are conducted in at least two input light guide units.

The central wavelength $\lambda_c$ of the device is derived from the mean or average between the broadcast wavelength or the mean wavelength of the specific wavelengths.

By connecting the input light guide units to the input free beam coupler and by arranging and dimensioning the output sections of the input light guide units relative to the output light guides such that each output light guide may be charged with at least two optical signals of different wavelengths, the optical signals of the input light guide sections are fed at low attenuation losses and in a controlled manner to the output light guides by way of the imaging function of the so-called phased array spectograph formed by the input free beam coupler, the light guide grid and the output free beam coupler. By separating the power division which takes place entirely within the input free beam coupler, from the imaging controlled superposition in the output free beam coupler, optimizing measures may be separately carried out effectively at the input free beam coupler and the input light guide units connected thereto and the output free beam coupler and its connected output light guide unit.

In one embodiment of the invention at least a first input light guide unit is provided with a plurality of input light guides connected to the input free beam coupler. In a related variant, optical signals of different wavelengths grouped around a center wavelength may be conducted in the individual input light guides of the first input light guide unit, the input light guides being arranged and dimensioned relative to the output light guides such that each output light guide is provided with an associated input light guide of the first input light guide unit.

In another variant, there is provided a second input light guide unit provided with individual input light guides which may be charged with an optical signal of a single wavelength, the input light guides being arranged and dimensioned relative to the output light guides such that each output light guide is associated with an input light guide of the second input light guide unit.

In an advantageous embodiment, there are provided two input light guides provided with input light guides as in the preceding embodiments so that each output light guide is associated with exactly one input light guide of the first input light guide unit and one input light guide of the second light guide unit. This results in a particularly low systems attenuation at a controlled multiplex function.

In a further embodiment, at least one input light guide unit is provided with an input light guide which preferably flares out hyperbolically in the direction of the input free beam coupler. Into this single flaring input free beam coupler an optical signal of a single wavelength may be fed which signal is to be distributed to the output light guides. While such a structure leads to somewhat higher attenuation losses, it permits coupling-in so-called broadcast wavelengths which fluctuate relatively strongly, for the flaring of the input light guide ensures that even at fluctuating wavelengths the output light guides are charged with the corresponding optical signal.

DESCRIPTION OF THE SEVERAL DRAWINGS

Figure 2:
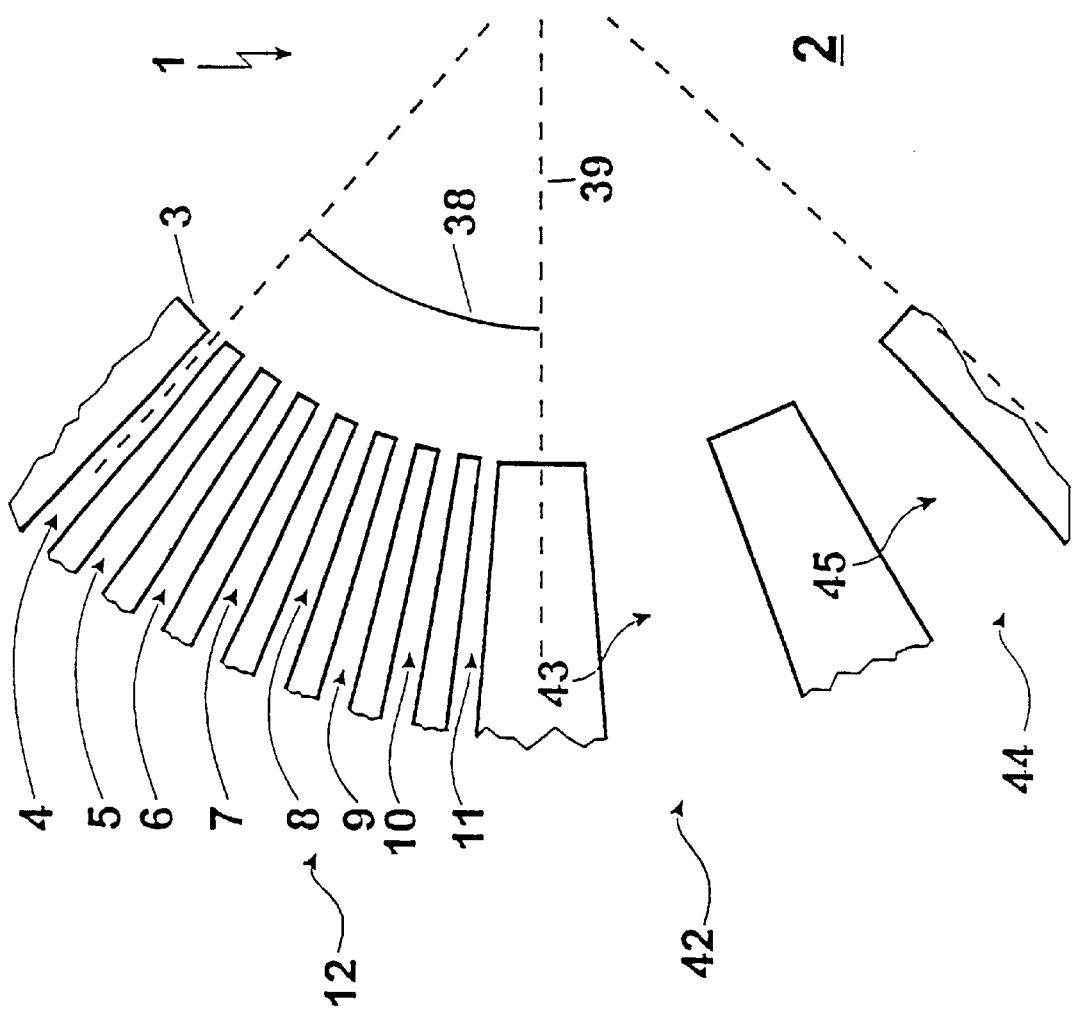

The novel features which are considered to be characteristic of the invention are set forth with particularity in the appended claims. The invention itself, however, in respect of its structure, construction and lay-out as well as manufacturing techniques, together with other objects and advantages thereof, will be best understood from the following description of preferred embodiments when read in connection with the appended drawings, in which:

FIG. 1 depicts an embodiment of a device for superposing optical signals of different wavelengths with input light guide units provided with two input light guides;

FIG. 2 shows, on an enlarged scale relative to FIG. 1, a further embodiment for superposing optical signals of different wavelengths in which an input light guide unit is provided with a plurality of input light guides and in which each of two further input light guide units is formed by an input light guide flaring in the direction of the input section in a free beam section of an input free beam coupler.

DETAILED DESCRIPTION OF PREFERRED EMBODIMENTS

FIG. 1 depicts an embodiment of a device for superposing optical signals of different wavelengths provided with an input free beam coupler 1. In the depicted embodiment, eight input light guides 4, 5, 6, 7, 8, 9, 10, 11 of a first input light guide unit 12 are connected by their output ends to a convex circularly curved input side 3 which limits an input free beam section 2 of the input free beam coupler 1, the output ends leading into the input free beam section 2 at a first input section. In addition, in the depicted embodiment the output ends of eight input light guides 13, 14, 15, 16, 17, 18, 19, 20 of a second input light guide unit 21 are connected to the input side 3, so that the output ends of the light guides lead into the input free beam section 2 at a second input section. The input light guide units 12, 21 are arranged at a distance from each other with the optical position of a center wavelength lying between the input sections.

A plurality of phase shift light guides 23 of a light guide grid 24 are connected to the convex circularly curved output side 22 of the input free beam coupler 1. The phase shift light guides 23 are formed of different lengths the difference in length between neighboring phase shift light guides 23 being constant. The constant difference in length is derived in a known manner from the order of the grid and the center wavelength.

The phase shift light guides 23 shown in a shortened state in FIG. 1 are connected to an input side 25 of an output free beam coupler 26 and lead into the output free beam section 27 thereof. Eight output light guides 29, 30, 31, 32, 33, 34, 35, 36 of an output light guide unit 37 are connected to a convex circularly shaped output side 28 of the output free beam coupler 26.

Preferably, the free beam couplers 1, 26 as well as the light guides 4 to 11, 13 to 20, 23, 29 to 36 of the light guide units 12, 21, 37 as well as the light guide grid 24 are made in planar light guide technology.

At their sections leading into the input free beam section 2, the input light guides 4 to 11 of the first input light guide unit 12 as well as the input light guides 13 to 20 of the second input light guide unit 21 are structured and dimensioned such that each output light guide 29 to 36 of the output light guide unit 37 may be charged with at least two optical signals of certain wavelengths.

It will be understood that there may be provided a greater as well as a lesser number of input light guides 4 to 11, 13 to 20 of the input light guide units 12, 21 as well as of the output light guides 29 to 36.

In the embodiment shown in FIG. 1 an optical signal of a wavelength, namely of a so-called broadcast wavelength, may be fed into the input light guides 13 to 20 of the second input light guide unit 21. For instance, the wavelength may be fed by an input light guide to a star coupler not shown in FIG. 1 for distribution to the input light guides 13 to 20 of the second input light guide unit 21. An optical signal may be fed into each of the input light guides 4 to 11 of the first input light guide unit 12; the optical signals fed into the input light guides 4 to 11 of the first input light guide unit 12 have a carrier of different wavelengths. The wavelengths which may be fed into the input light guides 4 to 11 of the first input light guide unit 12 are preferably grouped about a center wavelength which differs from the broadcast wavelength which may be fed into the input light guides 13 to 20 of the second input light guide unit 21, and among each other they have a much smaller wavelength spacing compared to the wavelength spacing between the broadcast wavelength and the center wavelength. The arrangement and dimensioning of the input sections of the input light guides 4 to 11 and 13 to 20 relative to the input sections of the output light guides 29 to 36 ensures that a specific wavelength and the broadcast wavelength may be fed into each output light guide 29 to 36.

In this connection, at a given position of the output light guide 29 to 36 associated with it, the position of an input light guide 4 to 11 of the first input signal light guide unit 12 is determined in accordance with the following basic positioning equation:

$$\Theta_{IN}^{(i)} = \frac{m}{n_s d}\left\{\lambda^{(i)} - \lambda_c\left[1 + \frac{1}{n_c}\frac{dn_c}{d\lambda}\bigg|_{\lambda=\lambda_c}(\lambda^{(i)} - \lambda_c)\right]\right\} - \Theta_{OUT}^{(i)}$$

wherein $\lambda^{(i)}$ is the wavelength propagating in an input light guide 4 to 11 of the first input light guide unit 12, $\lambda_c$ is the center wavelength of the device derived from the median between the broadcast wavelength or center wavelength of the specific wavelength, m is the order of refraction of the light guide grid 24, $n_s$ is the effective refractive index of the free beam sections 2, 27, d is the grid constant or pitch of the phase shift light guide 23 at its transition to the output free beam section 27 of the output free beam coupler 26, $\Theta^{(i)}_{IN}$ is the incident coupling angle 38 of the $i^{th}$ input light guide 4 to 11 relative to the input axis of symmetry 39 of the input free beam section 2 and $\Theta^{(i)}_{OUT}$ is the output angle 40 relative to the output axis of symmetry 41 of the output free beam section 27. In then presentation of FIG. 1 the axes of symmetry 39, 41 and the coupling angle 38, 40 have been shown for the first input light guide 4 and its associated eighth output light guide 36.

When a so-called broadcast wavelength is fed into the input light guides 13 to 20 of the second input light guide unit 21 the intermediate angles between neighboring output light guides 29 to 36 correspond to the intermediate angles between associated neighboring input light guides 13 to 20 of the second input light guide unit 21.

For purposes of a relatively simple fabrication it is useful to arrange the output light guides 29 and 36 equidistantly and centered around the axis of symmetry 41 so that a precision arrangement will only be required for the input light guides 4 to 11, 13 to 20.

In a variant of the embodiment shown in FIG. 1 the input light guides 13 to 20 of the second input light guide unit 21 are arranged relative to the output light guides 29 to 36 such that optical signals of further different specific wavelengths fed into the input light guides 13 to 20 of the second light guide input unit 21 may be fed as carriers to each output light guide 29 to 36 which signals will be superimposed on the broadcast wavelength fed into the input light guides 13 to 20 of the second input light guide unit 21. In this variant, the intermediate angles between neighboring output light guides 29 to 36 and intermediate angles between associated neighboring input light guides 13 to 20 of the second input light guide unit 21 are set up in accordance with the positioning equation set forth supra.

In a further variant of the embodiment shown in FIG. 1, the input light guides 4 to 11 of the first input light guide unit 12 are arranged, relative to the output light guides 29 to 36, such that a further broadcast wavelength fed into the input light guides 4 to 11 may be fed to each output light guide 29 to 36 which will superimpose on the broadcast wavelength fed into the input light guides 13 to 20 of the second input light guide unit 21.

Since frequently a broadcast wavelength is generated with a certain tolerance by an optical transmitter, it is useful to fabricate the input port sections of the input light guides 4 to 11, 13 to 20 in which any one of the broadcast wavelengths is propagating in so-called multi-mode interference technology in accordance with which the input port sections are flared out so that owing to the propagation characteristics of the phased array spectograph formed by the input free beam coupler 26, the light guide grid 24 and the output free beam coupler 26, all output light guides 29 to 36 are uniformly energized in a substantially rectangular intensity profile. Owing to the broader intensity profile the wavelength tolerance is markedly increased.

FIG. 2 depicts, in a presentation of enlarged scale relative to FIG. 1, a further embodiment of a device for superposing optical signals of different wavelengths, in which a first input light guide unit 12 structured similarly to the embodiment of FIG. 1, is provided with input light guides 4 to 11 which enter into the input free beam coupler 2 at the input coupling side 3. The embodiment according to FIG. 2 is additionally provided with a first broadband input light guide unit 42 which, being a so-called multi-mode interference light guide, at the input port section of its input free beam coupler 2 is of a preferably hyperbolically flaring structure. Furthermore, the embodiment of FIG. 2 is provided with a second broadband input light guide unit 44 which is also provided with a multimode interference light guide 45. In this manner, an image of a substantially rectangular intensity distribution of any signal which may be fed into this input light guide unit 42, 44 may be formed in the input port section of the output light guides 29 to 36. In the embodiment depicted in FIG. 2, the input axis of symmetry 39 of the input free beam coupler 1 is extending substantially in the middle between the first input light guide unit 12 and the first broadband input light guide unit 42, relative to their respective center axes.

A first so-called broadcast wavelength may be fed into the multi-mode interference light guide 43 of the first broadband input light guide unit 42, and a second so-called broadcast wavelength may be fed into the multi-mode interference light guide 45 of the second broadband input light guide unit 44. Preferably, the broadcast wavelengths are spectrally separated sufficiently to separate the input port sections of the multi-mode interference light guides 43, 45 from each other. This results in a clean spatial separation and image or aperture on the output light guides 29 to 36 of the optical signals which may be fed into the broadband input light guide units 42, 44. The multi-mode interference light guides 43, 45 of the broadband input light guide units 42, 44 are arranged such that output light guides 29 to 36 of the output light guide unit 37, not shown in FIG. 2, may receive both broadcast wavelengths.

Furthermore, each output light guide 29 to 36 may receive the specific wavelength propagating in one of the input light guides 4 to 11 of the first input light guide unit 12 so that a specific wavelength as well as the two broadcast wavelengths are conducted in each output light guide 29 to 36. Because of the relatively large input port section of the multi-mode interference light guides 43, 45 the output light guides 29 to 36 may, within a relatively wide range of wavelength tolerances, be energized substantially uniformly with the broadcast wavelengths.

What is claimed is:

1. A device for superposing optical signals of different wavelengths, comprising:

an input free beam coupler provided with a first free beam section;

an output free beam coupler provided with a second free beam section;

a light guide grid comprising phase shift light guides for coupling the first and second free beam sections;

a first input light guide unit for propagating at least one wavelength and connected to the input free beam coupler;

at least one second input light guide unit for propagating at least one wavelength and coupled to the first free beam section;

an output light guide unit coupled to the output free beam coupler and comprising a plurality of output light guides;

the input sections of the first and at least second input light guide units being arranged and dimensioned relative to an axis of symmetry of the output free beam section in accordance with formula $$\Theta_{IN}^{(i)} = \frac{m}{n_s d}\left\{\lambda^{(i)} - \lambda_c\left[1 + \frac{1}{n_c}\frac{dn_c}{d\lambda}\bigg|_{\lambda=\lambda_c}(\lambda^{(i)} - \lambda_c)\right]\right\} - \Theta_{OUT}^{(i)}$$

$\lambda^{(i)}$ being the wavelength propagating in an input waveguide of the input light guide units; $\lambda_c$ being the central wavelength of the device; m being the order of diffraction of the light guide grid; $n_c$ being the effective index of refraction of the phase shift light guide; $n_s$ being the effective index of refraction of the free beam sections; d being the grid constant (pitch) of the phase shift light guides at the transition to the second output free beam section; $\Theta^{(i)}_{IN}$ being the incident coupling angle of the $i^{th}$ input light guide relative to an input axis of symmetry of the first input free beam section and $\Theta^{(i)}_{OUT}$ being the output angle of divergence relative to the axis of symmetry of the output free beam section, such that each output light guide is energized by at least two optical signals of different wavelengths propagating in the first and at least second input light guide units.

2. The device of claim 1, wherein at least three input light guide units are coupled to the input free beam coupler.

3. The device of claim 1, wherein at least the first input light guide unit comprises a plurality of input light guides, the input light guides and the output light guides being arranged such that upon energizing each input light guide with a signal of a different wavelength each output wave guide is energized by a signal from a light guide of the first input light guide unit and a signal from the at least second input wave guide unit.

4. The device of claim 1, further provided with a third input light guide unit comprising a plurality of third input light guides, the input light guides of the first input light guide unit and of the third input light guide unit and the output light guides being arranged such that upon energizing each input light guide of the first light guide unit with a signal of a different wavelength and upon energizing the input wave guides of the third input wave guide unit with a signal of a further wavelength each output wave guide is energized by signals from associated input wave guides of the input wave guide units.

5. The device of claim 1, wherein at least one input wave guide unit is structured by light guides preferably hyperbolically flaring in the direction of the input of the free beam section such that a substantially rectangular distribution of intensity of the signal fed into the input light guide unit may be imaged in the input section of the output light guides.

6. The device of claim 1, wherein the output light guides are arranged at uniform distances from each other.

7. The device of claim 1, wherein the input sections of the input light guide units are spaced at a distance from each other.

8. The device of claim 1, wherein the input light guides and the light guides of the light guide grid are structured as planar light guides.

9. The device of claim 1, wherein the input light guides of an input light guide unit propagating a signal of a wavelength are connected to the outputs of a star coupler.

* * * * *